May 1, 1951      C. R. WOLTZ      2,550,748
SOLDERING IRON AND SUPPORT THEREFOR
Filed Jan. 3, 1947      2 Sheets-Sheet 1
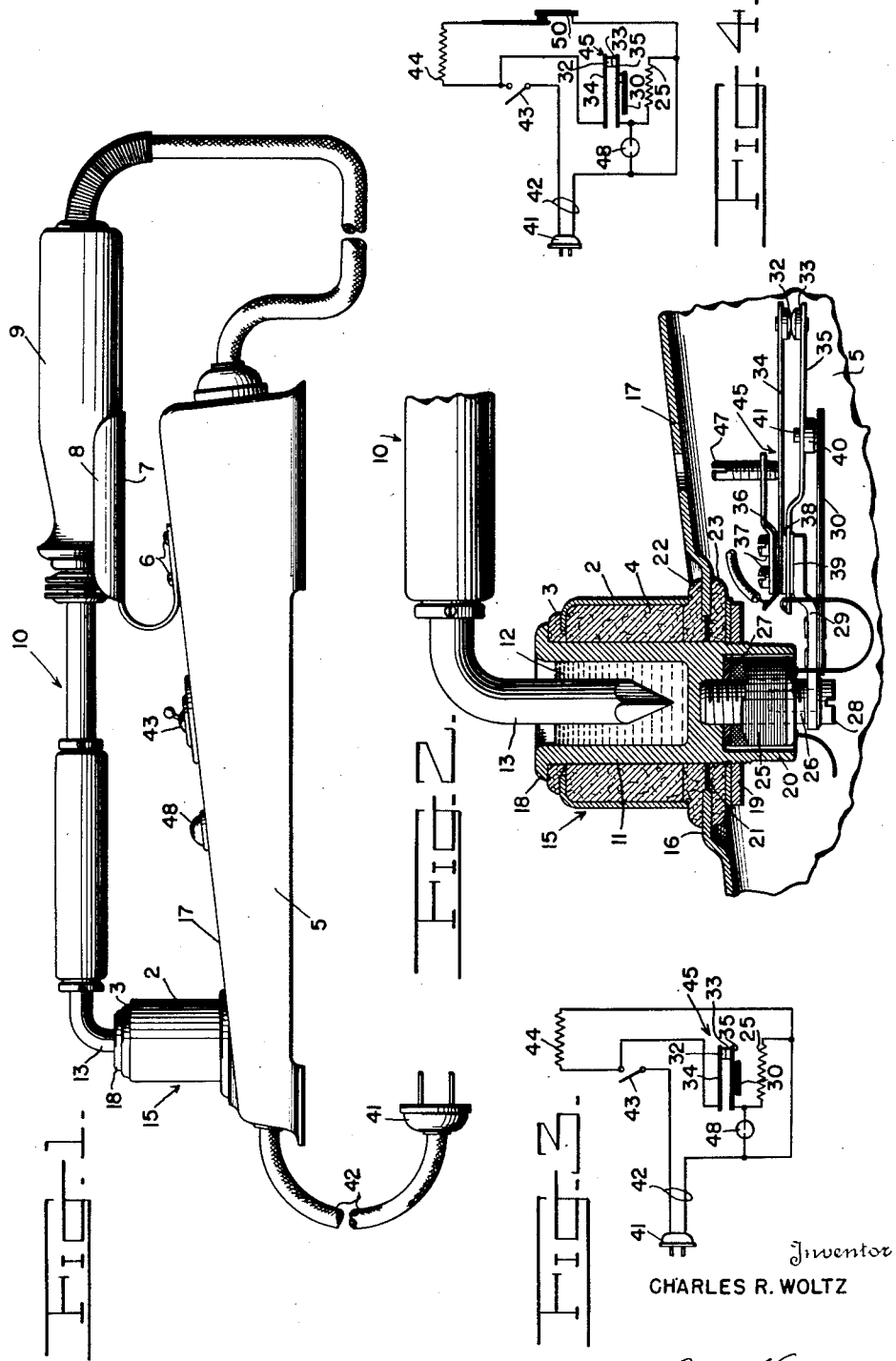
Inventor
CHARLES R. WOLTZ
M. O. Hayes
Attorney May 1, 1951 C. R. WOLTZ 2,550,748
SOLDERING IRON AND SUPPORT THEREFOR
Filed Jan. 3, 1947 2 Sheets-Sheet 2
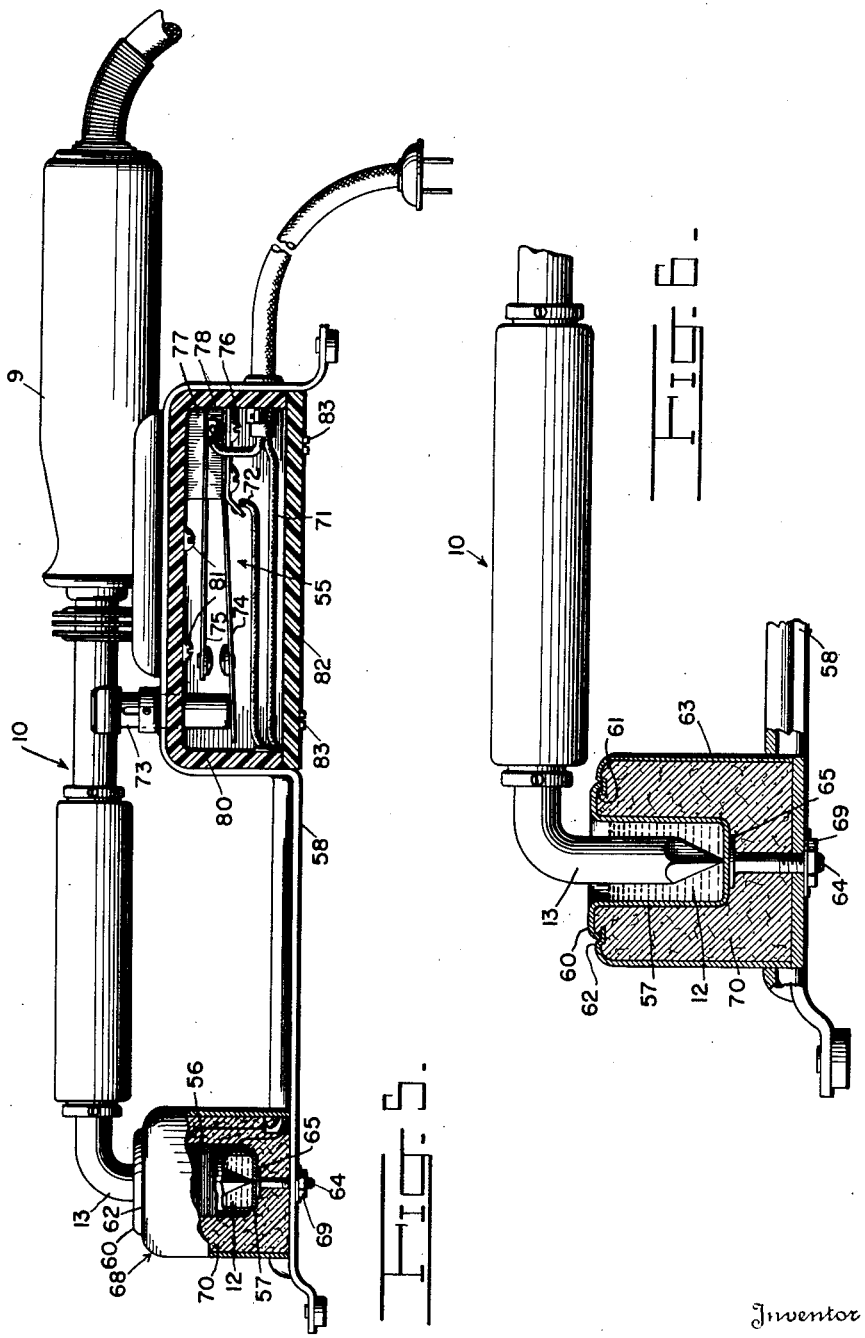
Inventor
CHARLES R. WOLTZ
By M. O. Hayes
Attorney Patented May 1, 1951

2,550,748

UNITED STATES PATENT OFFICE 2,550,748

SOLDERING IRON AND SUPPORT THEREFOR

Charles R. Woltz, Laurel, Md.

Application January 3, 1947, Serial No. 719,978

5 Claims. (Cl. 219—26)

(Granted under the act of March 3, 1883, as amended April 30, 1928; 370 O. G. 757)

This invention relates generally to an electric soldering iron, and more particularly to the combination of an electric soldering iron and a support therefor including means for maintaining the tip of the iron clean and free of corrosion, which otherwise would form thereon, as the result of the iron being exposed to the atmosphere when left heated for long periods of time.

In soldering iron and supporting apparatus of the type heretofore described, certain elements have been provided therein for controlling the temperature of the iron when it is resting on the support, including various switch and thermostatic controls for shutting off or reducing the current to the iron when the temperature thereof exceeds a predetermined degree thereby to prevent overheating thereof and effect a saving to the user by prolonging the life of the iron as well as reducing the operating cost by reducing the quantity of current consumed thereby.

It has been found in service, however, that the principal inconvenience and expense incurred by the user of such soldering equipment particularly in the commercial application thereof, is not from the iron overheating, or the quantity of current consumed thereby, but results from the annoyance and delay in preparing and cleaning the tip portion of the iron to maintain it in a satisfactory solder applying condition when left heated for long periods of time. This cleaning of the tip requires the removal of the corrosion and oxide that rapidly forms thereon by reason of it being exposed to the atmosphere while heated, and is generally done by dipping the iron in acid or by scraping or filing the tip thereof at frequent intervals so as to provide a clean working surface which must afterwards be tinned with flux and solder before using. This continual disintegration and wearing away of the tip portion of the iron by reason of such corrosion and repeated cleaning thereof, requires that this member be frequently replaced, adding further inconvenience and expense to the care and maintenance of such conventional apparatus.

The present invention provides means for obviating the difficulties of these prior devices while retaining all the advantages thereof, this being accomplished by providing on the support or stand for the iron a suitable receptacle adapted to receive therewithin the tip portion of the iron when the iron is resting on the stand, the receptacle containing molten solder in sufficient quantity to puddle about the soldering tip of the iron and thereby exclude the oxidizing atmosphere therefrom and maintain it at all times in a readily usable, clean and freshly tinned condition.

The principal object of the present invention, therefore, is to provide a new and improved soldering iron apparatus including a soldering iron and a support therefor in which the atmosphere is excluded from the tip portion of the soldering iron when resting on the support whereby corrosion and oxidation of the tip thereof is obviated.

Another object of the present invention is to provide a soldering iron and stand combination including a molten solder receptacle within which the soldering tip portion of the iron is adapted to be retained when the iron is resting on the stand.

Still another object is to provide a soldering iron and support combination in which the solder applying tip portion of the iron is so formed as to rest within a solder retaining receptacle forming a part of the support and serves, when heated, to maintain in a molten condition a sufficient quantity of solder within the receptacle to puddle about the tip thereby excluding the oxygen therefrom and maintain the tip in a clean and freshly tinned condition.

A still further object of the invention is to provide a soldering iron support having a solder retaining receptacle within which the tip of the iron is adapted to be placed for maintaining solder within the receptacle in a molten condition when the iron is resting therein, the receptacle having in heat communication therewith a thermostatically controlled heating element for continuously maintaining the solder in a molten condition after removal of the iron therefrom.

Still another object is to provide a soldering iron including a solder retaining receptacle within which the tip of the iron is adapted to be placed for maintaining a quantity of solder therein in a molten condition when the iron is resting on the support, the receptacle having in heat communication therewith an electrical heating element and a control therefor operative responsively to the removal of the iron from the support to cause the energization of the element for maintaining the solder within the receptacle in a molten condition after the removal of the tip of the iron therefrom.

A still further object is to provide an electrical system for controlling the temperature of a soldering iron and the temperature of a quantity of molten solder within which the tip of the iron is normally submerged for preventing corrosion of the tip portion of the iron.

Additional objects, features, and advantages of the present invention are those residing in and relating to the novel construction and arrangement of the elements thereof, as will more clearly appear as the description proceeds, reference being now made to the accompanying drawings of which:

Fig. 1 is a view in elevation of the soldering iron and stand combination according to the preferred embodiment of the invention;

Fig. 2 is a somewhat enlarged fragmentary sectional view through the solder receptacle shown in Fig. 1;

Fig. 3 is a schematic view of the electrical system of the preferred embodiment of the invention shown in Fig. 1;

Fig. 4 is a schematic view of an alternate electrical system including a thermostatic control for the heating element of the soldering iron;

Fig. 5 is a view in elevation partly in section and partly broken away of another embodiment of the invention, and Fig. 6 is a fragmentary sectional view of an alternative form of the solder receptacle.

In Fig. 1 the housing 5 is preferably formed as a somewhat wedged shape casting to which is secured by screws 6 the supporting rack 7 suitably flanged at 8 to receive the handle portion 9 of an electric soldering iron 10. When the iron is resting upon the rack, in the manner shown, the angular tip portion 13 thereof will extend down into the molten solder filled receptacle 11 so that the solder 12 therein will rise about the tip of the iron thereby to exclude the atmosphere therefrom and prevent oxidation of the tinned portion of the tip while the iron is in resting position on the rack.

The solder receptacle assembly generally designated 15 includes the outer metallic housing 2 insulated from the receptacle by washers 3 and 4. The assembly is suitably formed to rest upon the surface 16 provided in the angular face 17 of the housing 5 and adapted to be drawn tightly thereto by the flange 18 upon tightening the nut 19 fashioned for threading over the extension 20 provided on the lower end of the receptacle 11. This extension passes through a central opening in washers 22 and 23 disposed concentrically of the opening 21 and arranged on opposite sides of the surface 16 respectively.

To facilitate the initial heating of the solder within the receptacle 11 and continuously maintain it thereafter in a molten condition as times when the iron is removed therefrom, an auxiliary heating element 25 is provided beneath the receptacle 11 in a manner adapted to transmit heat to the solder 12 therein, principally by means of the copper stud screw 26 about which the coil is wound and electrically insulated therefrom by insulation 27. Secured to the free end of this stud 26 as by screw 28 is the bar piece 29 of metal suitable for the purpose of rapidly communicating heat, as received from the element 25 to the bimetallic thermal strip 30 connected thereto. This thermal element upon receiving heat from the receptacle assembly by way of the stud screw 26 and bar piece 29 is adapted to bend downwardly for controlling the engagement of the contacts 32 and 33 of the spring switch arms 34 and 35 respectively. The insulating washers 36, 38 and 39 provide means for electrically separating the arms 34 and 35 from each other and from the bar 29 to which they are secured by screws 37. The arm 35 is also insulated from the strip 30 by the preferably ceramic button 40 retained therebetween by means of the lug 41 fitted within a suitable opening provided in the arm 35.

On Fig. 3 is shown in diagrammatic form a complete circuit suitable for use with the device of Fig. 1.

Current is supplied through the coupling member 41 to the various components of the device by means of the two-conductor cable 42. Connected to the cable in a manner adapted to control the flow of current therethrough, is the manually operable switch 43, the closing of which causes the energization of the heating element 44 of the iron and also the element 25 of the heater beneath the receptacle 11 by way of the thermal control switch generally designated 45. The heat from these two elements operates to reduce the solder within the receptacle rapidly to the desired molten state suitable for removal of the soldering iron therefrom. During the time required from the solder to reach the desired temperature, heat is also being applied by way of the copper strip 29 to the thermal strip 30 causing it to bend downward and thereby allow the spring switch arm 35, normally biased in a downward and open circuit position, to bend in a direction away from the arm 34. By reason of the fact that the arm 34 is biased in a normal circuit closing direction by adjustment of the set screw 47 thereagainst, contact 32 thereof will follow the downward movement of the arm 35 until the thermal strip has attained a predetermined temperature at which time the contact 33 disengages from contacts 32 interrupting the circuit through the heater coil 25 connected in series therewith to prevent further operation of the heater coil until the iron has been removed from the receptacle 11 for a period of time sufficient to cause a cooling of the solder therein below a predetermined temperature corresponding to the setting of screw 47. When this occurs the thermal strip 30 will bend upward to force the arm 35 back into engagement with the arm 34, thereby again connecting the heater 25 into the circuit so as to compensate for the loss of heat normally received from the iron which is sufficiently hot to maintain the solder within the receptacle in a molten state. In this way the temperature of the solder is caused to remain substantially constant even though the iron may be removed therefrom for long periods of time.

The neon signal lamp 48, Figs. 1 and 3, is employed for the purpose of indicating the engagement of the contacts 32 and 33 and thereby facilitating the operation of adjusting the control switch 45 by screw 47.

This molten solder 12 within which the tip portion 13 of the iron is repeatedly immersed, during the course of normal use thereof, not only operates to shield and insulate the tip against oxidation resulting from exposure to the atmosphere, but the solder removes from the surface of the iron such corrosive acids as are generally present in soldering flux and which, if allowed to remain thereon, as is the case with conventional apparatus, would penetrate the tinned surface of the tip to attack and corrode the copper body thereof.

The circuit diagram shown in Fig. 4 is substantially the same as that shown in Fig. 3 except that a second thermal control 50 is employed in the circuit for controlling the temperature of the iron element 44, thermal control 50 being located internally of the iron and in intimate heat conducting relationship with the heating element of the iron in accordance with conventional practice.

In the embodiment of the invention shown in Fig. 5 a switch 55 responsive to the weight of the iron has been incorporated therein for controlling the energization of the receptacle heater in lieu of the thermal responsive mechanism 45 as provided in Figs. 2, 3 and 4. An auxiliary heating element 56 as shown arranged about the receptacle 57, is primarily for the purpose of supplementing the iron 10 in continuously maintaining the solder 12 therein at the desired temperature after the removal of the tip of the iron therefrom. This heating element 56 is connected in a controlled electrical circuit in such a manner as to be energized only when the iron 10 is lifted from the support 58 and deenergized as the iron is again placed thereon. In this way the element operates to compensate for the heat loss from the solder during the periods, when the iron is removed therefrom.

The solder receptacle 57 is preferably of light construction and composed of corrosive resistant material such, for example, as stainless steel with an external peripheral flange 60 formed thereon for fitting within a circular depression 61 provided within the surface 62 of the housing 63. The bolt 64, the head 65 thereof being secured to the under surface of the receptacle 57 in any suitable manner, provides means for drawing the assembly 68 to the face of the support 59 upon tightening the nut 69.

The element 56 may be arranged about the outer surface of the receptacle 57 in any suitable manner for applying heat thereto but electrically insulated therefrom preferably by strips of mica or the like. The thermal insulation 70 provided between the housing 63 and the receptacle 57 prevents a rapid dissipation of the heat therefrom and thereby helps to maintain the solder 12 within the receptacle in a suitable molten condition.

The necessary current for energizing the element 56 is supplied through leads 71 and 72. The lead 72 is connected to the normally closed pressure responsive switch 55 but adapted to be operated to open circuit position by downward movement of the plunger 73 upon the placing of the soldering iron 10 thereon. The weight of the iron upon the plunger forces out of circuit closing engagement the switch arm 74 with the arm 75, but as the iron is removed from the support to free the plunger, the spring action of the arm 74 lifts the plunger and allows the arm to move into circuit closing engagement with arm 75 and thereby again close the circuit through the element 56.

The blades of the switch 55 are secured by screws 76 to the lug 77 provided within the housing and electrically insulated from each other by washer 78. The housing 80 preferably composed of plastic material is secured to the under surface of the support 58 by screws 81 and closed by means of the plate cover 82 secured thereto by screws 83.

In Fig. 6 is shown an alternative form of solder receptacle assembly and support therefor being substantially the same as shown in Fig. 5 except that the heating element 56 and switch 55 have been omitted therefrom. Such an arrangement requires that all heat supplied to the solder within the receptacle be received directly from the tip portion 13 of the iron 10. The thermal insulation 70 provided between the housing 63 and receptacle 57 prevents rapid dissipation of the heat therefrom and thereby maintains the solder 12 within the receptacle in a suitable molten condition long after the removal of the iron. This form of the invention requires that the iron be connected to an independent electrical outlet, rather than to an outlet arranged within the support as shown in Fig. 1.

It is understood that the receptacle may be constructed, or arranged on the support in any suitable manner and will operate to keep the tip portion of the iron clear and free of corrosion so long as the solder therein suitably covers the solder applying tip portion of the iron. A mere depression within the support will suffice so long as it will pocket a sufficient quantity of solder, although, without some form of thermal insulation provided between the receptacle and the support the radiating surface of the support will dissipate considerable heat from the iron when resting within the solder and decrease the time interval in which the iron may be removed therefrom before the solder solidifies within the receptacle.

While the invention has been described with reference to certain preferred examples thereof which give satisfactory results, it is to be understood by those skilled in the art to which the invention pertains, after understanding the invention, that various changes and modifications may be made without departing from the spirit and scope of the invention and it is intended, therefore, to cover in the appended claims all such changes and modifications.

The invention herein described and claimed may be manufactured by or for the Government of the United States of America for governmental purposes without the payment of any royalties thereon or therefor.

What is claimed as new and desired to be secured by Letters Patent of the United States is:

1. In a device of the character disclosed, in combination, an electric soldering iron, a solder applying tip on said iron, an electric heating element arranged in said iron and adapted when energized to apply heat to said tip, a support for said iron including a receptacle adapted to retain therewithin a quantity of molten solder within which the tip of the iron is immersed when the iron is resting on said support, an auxiliary electric heating element arranged on said support in heat transmitting relation with respect to the receptacle and adapted when energized to apply heat thereto sufficiently to maintain the solder within the receptacle molten while the iron is removed from said support, a switch, a circuit including said switch for energizing said auxiliary element when the switch is closed, and switch operating means controlled by the iron for opening said switch while the iron is on said support.

2. In a device of the character disclosed, in combination, an electric soldering iron having a solder applying tip thereon and an electric heating element arranged in said iron in heat transmitting relation with respect to said tip, means for connecting said element to a source of electrical power, a support for said iron including a receptacle adapted to retain a quantity of molten solder therein within which the tip of the iron is immersed when the iron is resting on said support, the tip being operative to communicate heat from said element to the solder in the receptacle sufficient to maintain the solder molten while the iron is on said support, an auxiliary electric heating element arranged on said support in heat transmitting relation with respect to said receptacle and effective when energized to apply heat to the solder therein, a circuit including a switch for energizing said auxiliary element when the switch is closed, and switch operating means operatively associated with said switch and controlled by the iron for maintaining said switch open while said iron is on said support.

3. In a device of the character disclosed, in combination, an electric soldering iron, a solder applying tip on said iron, an electric heating element arranged in said iron to apply heat to said tip, circuit means for conveying current to said heating element, a support for said iron including a receptacle adapted to retain a quantity of solder therein within which the tip of the iron is immersed when the iron is resting on said support, an auxiliary electric heating element arranged on said support and adapted when energized to apply heat to said receptacle concurrently with said iron to raise the temperature of said solder to a molten condition, a circuit for energizing said auxiliary element, an electric switch arranged in said circuit, said switch having an open and a closed circuit position, a thermoresponsive element operatively associated with said switch and effective to operate the switch to its open circuit position when the temperature of the solder in the receptacle reaches a predetermined value in response to heat applied thereto by said iron and auxiliary heating elements, said thermoresponsive element being effective to operate said switch to its closed circuit position as the temperature of the solder drops to a second value when the iron has been removed from the support, both of said temperature values being above the melting point of the solder.

4. In a device of a character disclosed, the combination of an electric soldering iron having a solder applying tip and an electric heating element arranged in heat transmitting relation with respect thereto, a support for said iron, a receptacle secured to said support and adapted to retain a quantity of molten solder therein within which the tip of the iron is immersed when the iron is resting on said support, said heating element having sufficient heating capacity when energized to maintain the solder molten at a predetermined temperature while the iron is on the support and the tip is immersed in the solder, a second electric heating element arranged on said support in heat transmitting relation with respect to said receptacle and having sufficient heating capacity when energized to maintain the solder molten substantially at said predetermined temperature, circuit means for connecting said heating elements in parallel for energization from a common source of electrical power, means including a switch connected in series with said second heating element and effective to disconnect the second element from said source when the iron is on the support, and electroresponsive means connected in series with said second heating element for visually indicating when the second heating element is disconnected from the source of power.

5. In a device of a character disclosed, the combination of an electric soldering iron having a solder applying tip and an electric heating element arranged in heat transmitting relation with respect thereto, a support for said iron, a receptacle secured to said support and adapted to retain a quantity of molten solder therein within which the tip of the iron is immersed when the iron is resting on the support, said heating element having sufficient heating capacity when energized to maintain the solder molten at a predetermined temperature while the iron is on the support and the tip is immersed in the solder, a second electric heating element arranged on said support in heat transmitting relation with respect to said receptacle and having sufficient heating capacity when energized to maintain the solder molten at a second predetermined temperature, circuit means for connecting said heating elements in parallel for energization from a common electrical power source, a switch connected in series with said second heating element, a thermostatic element responsive to the temperature of the solder and effective to open said switch when the temperature of the solder reaches said first predetermined value and effective to close the switch when the temperature of the solder falls to said second predetermined value, electroresponsive means connected in series with said switch and said second heating element for visually indicating when the second heating element has been disconnected from said power source upon opening of said switch, and thermostatically controlled switch means including a switch connected in series with said heating element of the iron and a thermostatic element responsive to the heat of the iron for opening said last named switch to deenergize the iron heating element when the temperature of the iron rises to a third predetermined value which exceeds said first predetermined value.

CHARLES R. WOLTZ.

REFERENCES CITED

The following references are of record in the file of this patent:

UNITED STATES PATENTS

| Number | Name | Date |
|---|---|---|
| 908,712 | Van Dolsen | Jan. 5, 1909 |
| 1,421,850 | Shirk et al. | July 4, 1922 |
| 1,425,633 | Colby | Aug. 15, 1922 |
| 1,497,104 | Lamb | June 10, 1924 |
| 1,662,556 | Woodson | Mar. 13, 1928 |
| 2,170,681 | Finlayson | Aug. 22, 1939 |
| 2,192,655 | Smith | Mar. 5, 1940 |
| 2,213,439 | Young | Sept. 3, 1940 |
| 2,228,571 | Kuhn et al. | Jan. 14, 1941 |
| 2,308,098 | Neal | Jan. 12, 1943 |
| 2,326,572 | Shangle | Aug. 10, 1943 |
| 2,456,030 | Sohns | Dec. 14, 1948 |

FOREIGN PATENTS

| Number | Country | Date |
|---|---|---|
| 2,125 | Great Britain | Jan. 26, 1897 |